United States Patent [19]

Gettleman et al.

[11] Patent Number: 5,987,332

[45] Date of Patent: Nov. 16, 1999

[54] METHOD OF PROVIDING A SUBSCRIBER UNIT WITH NEIGHBOR CELL INFORMATION DURING ONGOING COMMUNICATION

[75] Inventors: Eric W. Gettleman, Tampa; Anil N. Patel, Boca Raton; Todd M. Russell, Plantation; Audrey Longhurst, Weston, all of Fla.

[73] Assignee: Motorola, Inc., Schaumburg, Ill.

[21] Appl. No.: 08/919,519

[22] Filed: Aug. 28, 1997

[51] Int. Cl.$^6$ ................................................ H04B 7/00

[52] U.S. Cl. .................... 455/518; 455/511; 455/519; 455/520; 455/525

[58] Field of Search ................................ 455/432, 433, 455/434, 435, 436, 437, 438, 439, 440, 509, 511, 512, 517–521, 524–525

[56] References Cited

U.S. PATENT DOCUMENTS

| | | | |
|---|---|---|---|
| 5,103,306 | 4/1992 | Weiman et al. | 358/133 |
| 5,222,248 | 6/1993 | McDonald et al. | 455/33.2 |
| 5,239,678 | 8/1993 | Grube et al. | 455/511 |
| 5,260,943 | 11/1993 | Comroe et al. | 370/95.1 |
| 5,276,906 | 1/1994 | Felix | 455/33.2 |
| 5,327,575 | 7/1994 | Menich et al. | 455/440 |
| 5,586,338 | 12/1996 | Lynch et al. | 455/34.1 |
| 5,649,291 | 7/1997 | Tayloe | 370/332 |
| 5,649,303 | 7/1997 | Hess et al. | 455/63 |
| 5,850,611 | 12/1998 | Krebs | 455/518 |
| 5,854,981 | 12/1998 | Wallstedt et al. | 455/439 |

*Primary Examiner*—Reinhard J. Eisenzopf
*Assistant Examiner*—Lester G. Kincaid
*Attorney, Agent, or Firm*—Andrew S. Fuller

[57] ABSTRACT

A subscriber (510) to a radio communication system acquires new neighbor cell information after switching to a new server site (530) during lulls in an ongoing communication session. In one embodiment, the new server site (530) broadcasts neighbor cell list information during lulls in the communication activity on the communication channel in an unsolicited manner (710, 720). In an alternative embodiment, the subscriber (510) first transmits a request to the server site for neighbor cell list information during a lull in communication activity (810, 820). The server site (530) responds by transmitting neighbor cell list information during one or more lulls in communication activity on the communication channel (830, 840).

14 Claims, 8 Drawing Sheets

METHOD OF PROVIDING A SUBSCRIBER UNIT WITH NEIGHBOR CELL INFORMATION DURING ONGOING COMMUNICATION

TECHNICAL FIELD

This invention relates in general to radio communication systems, and more particularly, to the management of neighbor list information during a communication session.

BACKGROUND

Geographically dispersed transceiver sites are often employed in two-way radio communication systems to support subscribers operating over a wide coverage area. Ordinarily, the sites are arranged such that each provides coverage for a particular geographic region, which may have some overlap. A subscriber interfaces with the radio communication system through a particular transceiver site, referred to herein as a server site. When a subscriber moves from one location to another, it may be advantageous to switch server operations from one site to another, such as a neighboring site, in order to maintain a high quality communication link. The process of switching server sites during an ongoing communication session is generally referred to in the art as hand-off or hand-over. The hand-off decision process usually involves a determination of the quality of signals received by the subscriber from its server site, or vice versa, and the availability and suitability of other potential server sites that may be in communication range of the subscriber. The hand-off decision may be made using information gathered by the server site, information gathered by the subscriber, or a combination of both.

In one prior art example, a subscriber maintains a list of control frequencies used by neighboring sites, and monitors the signal quality and/or other communication parameters for signals emanating from these sites. The information gathered by the subscriber is then used to select a suitable hand-off server site. The list of frequencies representing neighboring sites is referred to herein as a monitor list. The monitor list may be preprogrammed into the subscriber or downloaded from the system. A prior art hand-off process is described in U.S. Pat. No. 5,260,943, issued to Comroe et al., on Nov. 9, 1993, for a TDM Hand-off Technique Using Time Differences, the entire contents of which are hereby incorporated by reference. Here, a subscriber receives a monitor list from a site with which it is communicating satisfactorily. This monitor list is used to determine potential server sites for use when a hand-off becomes necessary.

A problem may arise when a subscriber is engaged in an ongoing communication session and performs a hand-off process, thereby switching to a new server site. Potentially, the monitor list could become outdated such the subscriber is unable to switch to an appropriate server site that is not on the list. For example, consider a subscriber that performs a hand-off because of a temporary radio frequency (RF) interference or obstruction, such as from a passing vehicle or from a building or bridge. Until the monitor list is updated, the subscriber may be unable to revert to the old server site that was previously providing system services, as the old server site was not in its monitor list. Such an occurrence is a commonly encountered problem in some prior art systems. Oftentimes, priority is given to utilizing available communication resources to maintain the ongoing communication session without interruption. Thus, the system may be unable to provide new monitor list in a timely manner. The problem becomes more acute when the subscriber is engaged in a group dispatch call along with several other subscribers, and much coordination is needed to provide new monitor list information without losing any of the ongoing communication.

It is desirable to provide a system in which a subscriber is provided with adequate monitor list information to determine potential server sites while participating in an ongoing communication session. Preferably, such information is provided with minimal impact on the ongoing communication session.

DETAILED DESCRIPTION OF THE PREFERRED EMBODIMENT

The present invention provides for the acquisition of neighbor cell information from a server site during an ongoing communication session, while participating in a group dispatch call. Particularly, upon switching server sites during an ongoing communication session, a subscriber unit receives new neighbor site monitor list information from the new server site during detected lulls in the communication activity. Generally, the server establishes a communication channel connected to the ongoing communication session on behalf of the subscriber unit. In a first embodiment, after connecting the subscriber unit, the server site broadcasts unsolicited neighbor cell list information during lulls in the communication activity on the communication channel. In a second embodiment, the subscriber unit first transmits a request to the server site for neighbor cell list information during a lull in communication activity. The server site responds by transmitting neighbor cell list information during one or more lulls in communication activity on the communication channel. The new neighbor cell information is used to perform subsequent monitoring for potential server sites.

Figure 1:
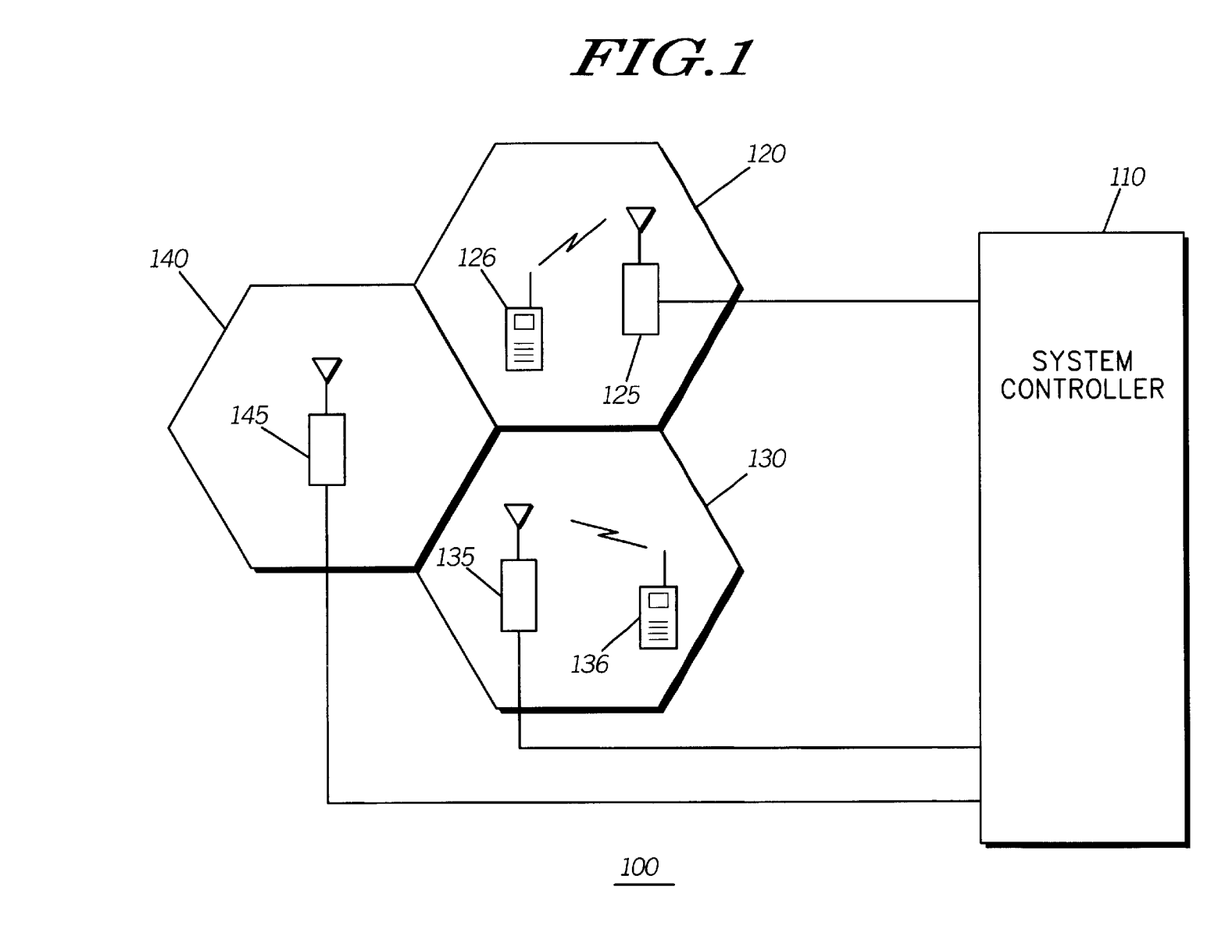
FIG. 1 is a representation of a radio communication system operating in accordance with the present invention.

FIG. 1 shows a block diagram of a radio communication system 100, operating in accordance with the present invention. In the preferred embodiment, the communication system 100 provides a radio network infrastructure that supports telephone, dispatch, data, and other communication services over a wireless network. Wireless communications occur over the network using a time division multiplexed (TDM) protocol, which is described in more detail below.

The system 100 includes a system controller site 110, coupled communication cell sites 125, 135, 145, and subscriber units 126, 136. The controller 110 includes computational and communication equipment that implement management functions for the radio communication system 100. For example, the controller 110 manages and coordinates communication access to and from each subscriber unit 126, 136 through the sites 125, 135, 145, and allocates communication resources at each site. Additionally, the controller 110 coordinates communication between participants of the communication system and entities (not shown) external to the system 100, such as to a public switched telephone network, and the like. The system 100 has a coverage area that includes separate coverage regions 120, 130, 140, which typically overlap (overlapping not shown). Each coverage region is supported by one of the cell sites 125, 135, 145. The cell sites 125, 135, 145 preferably comprise radio transceivers that function as base stations. The cell sites 125, 135, 145 are configured to support subscriber communication within their respective coverage regions.

The subscriber units 126, 136 are two-way wireless devices, such as portable or mobile two-way radio transceivers, or other electronic device with a wireless communication portion. Generally, a subscriber unit operates within the radio system 100 through an affiliated site using communication resources, such as wireless frequencies, allocated for use by that site. The affiliated site is referred to herein as a server site or server cell site. Oftentimes, a subscriber unit moves from the coverage area of a first site into the coverage area of a second site. To maintain a communication link, site affiliation is transferred from the first site to the second site. This process is known as hand-over or hand-off. Hand-off protocols for TDM systems are known in the art as is exemplified in U.S. Pat. No. 5,159,593, issued to D'Amico, et al on Oct. 27, 1992 for Channel Acquisition and Hand-Off Method and Apparatus for a TDMA Communication System. Usually, the communication system is formed such that the coverage area of one site partially overlaps the coverage area of another site. Thus, at a given location and time, there may be two or more sites which could function as a server site for the subscriber unit. Generally, a mechanism using factors such as received signal strength, signal reception quality, user preference, and other such parameters, are combined in an algorithm to determine which site to use. According to the present invention the subscriber unit maintains a list (referred to herein as a "monitor list" or "neighbor cell list") that contains information needed for monitoring neighboring sites to determine potential server sites.

Figure 2:
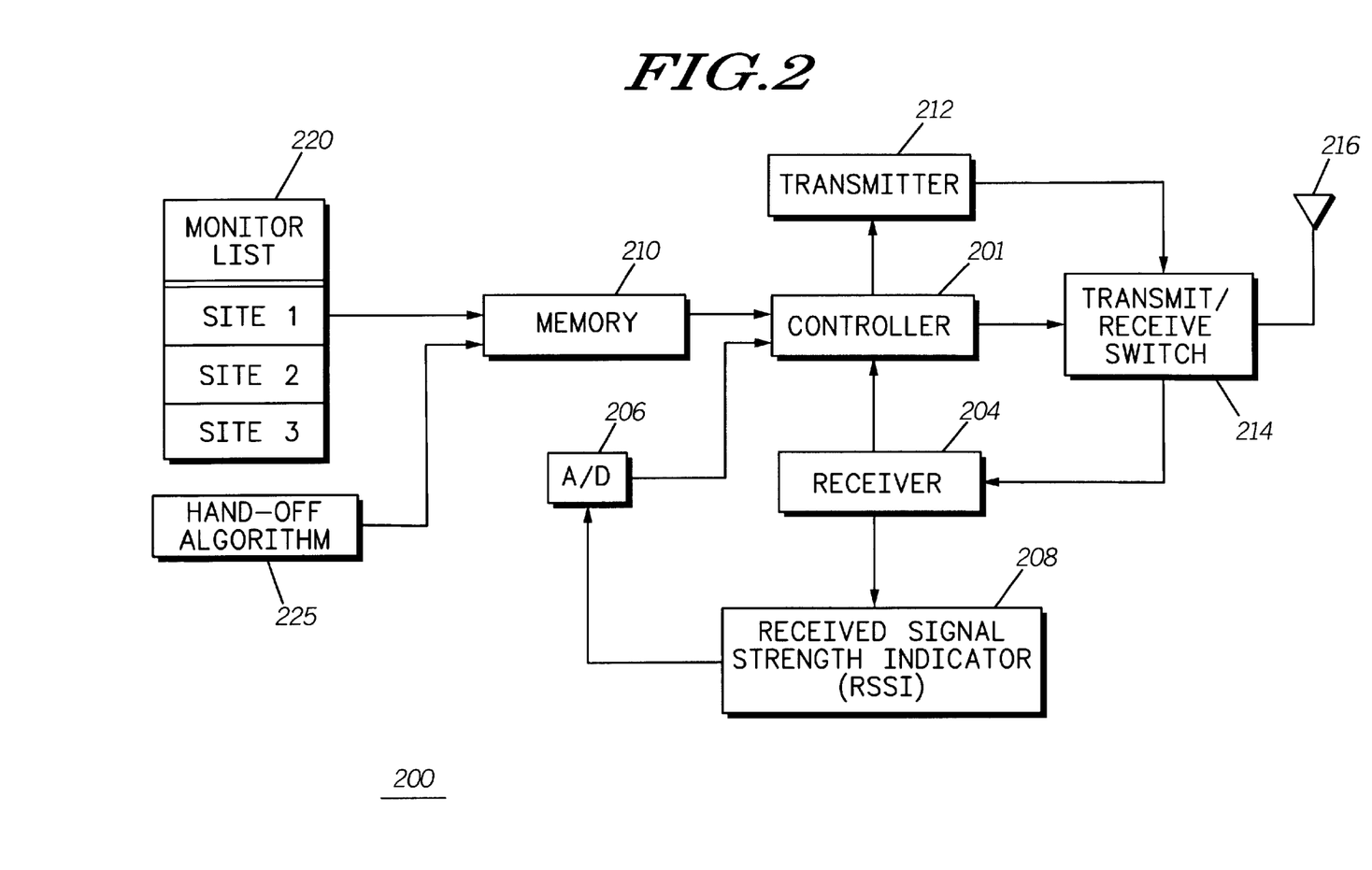
FIG. 2 is a block diagram of a subscriber unit, in accordance with the present invention.

FIG. 2 is a block diagram of a subscriber unit 200, in accordance with the present invention. The subscriber units 126, 136 of FIG. 1 are of similar construction. A controller 201 provides operational control for the subscriber unit 200 by executing well-known instructions which are stored in a coupled memory 210. The memory 210 also stores a monitor list 220, that contains a set of communication channels, frequencies, or other communication resources, to be monitored by the subscriber unit 200, in order to determine a potential server site. The monitor 220 list may be preprogrammed into the subscriber unit 200, or the list may be downloaded from a server site in an over-the-air transmission.

The subscriber unit 200 selectively receives signals through an antenna 216 which is coupled to a transmit/receive (T/R) switch 214. When receiving, the T/R switch 214 is under the control of the controller 201 which effects the coupling of the antenna 216 to a receiver 204. The receiver 204 decodes the received signals and presents those signals to the controller 201 for processing. A transmitter 212 is operably coupled to the controller 201. For transmit operations, the T/R switch 214 is positioned so that the transmitter 212 can operate through the antenna 216.

The subscriber unit 200 operates to monitor the list of communication channels to detect signals transmitted by neighboring sites, i.e., sites other than its server site, that are within communication range of the subscriber unit 200. The controller 201 receives a received signal strength indicator (RSSI) signal from a RSSI circuit 208. The RSSI is related to the strength of the received signal, and its noise characteristics. The RSSI circuit 208 uses an analog to digital converter 206 to present a digital RSSI to the controller 201. Using the RSSI signal, the controller 201 determines information regarding the proximity of the site to the subscriber unit 200. Preferably, the communication channels monitored correspond to control channels on which information pertaining to the identification and characteristics of the site is transmitted. The information collected is used to rank each site according to its suitability as a potential server site. The subscriber unit 200 operates to switch server sites as needed using a hand-off algorithm 225 stored in memory 210.

Figure 3:
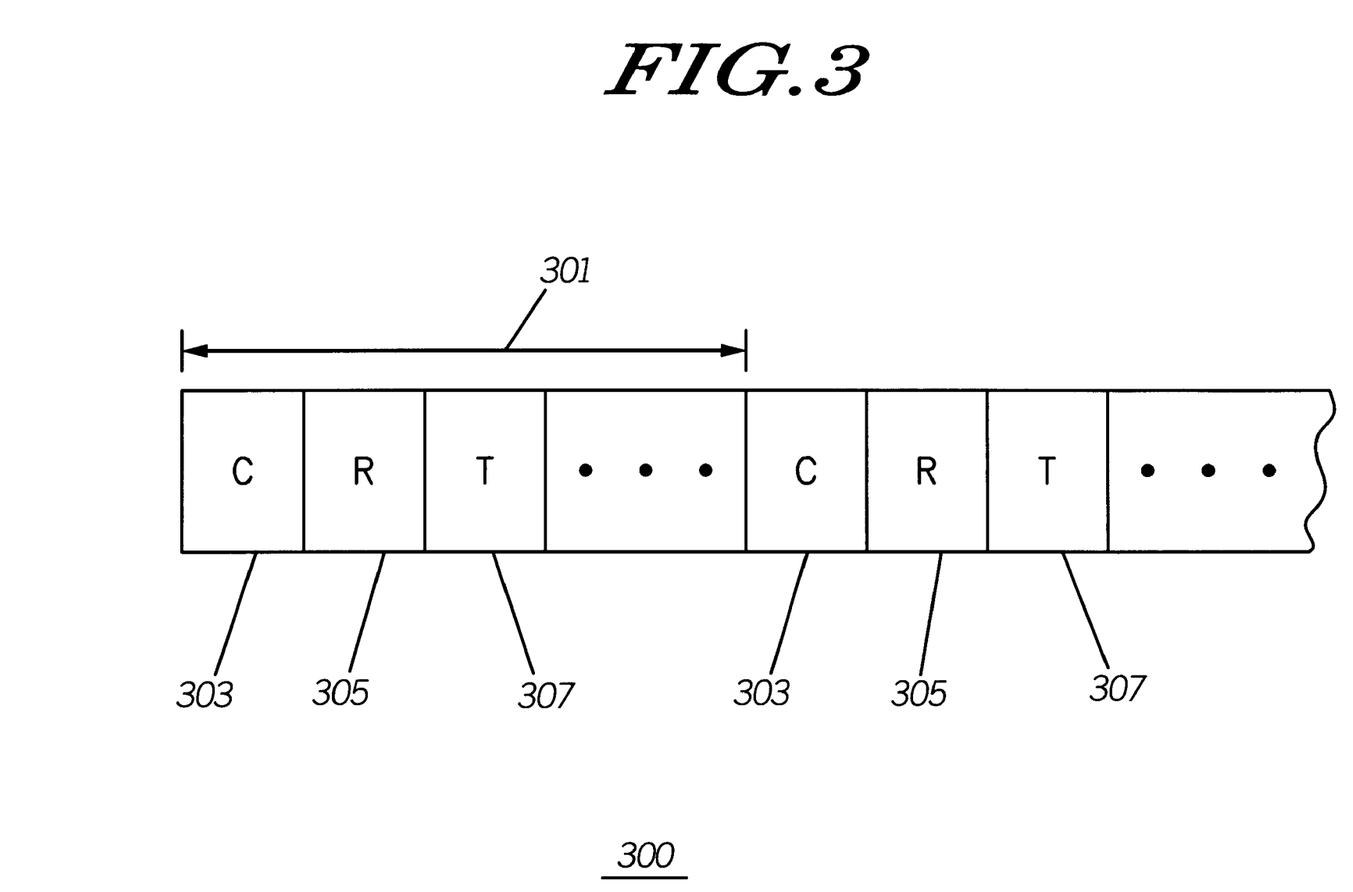
FIG. 3 is a block representation of a time division multiplexing protocol frame, in accordance with the present invention.

As mentioned earlier, the system operates using a TDM protocol. Under the TDM protocol, a communication resource, such as a wireless carrier frequency, is divided into time frames, and the frames are subdivided into time slots. FIG. 3 shows a block representation 300 of such a TDM frame for duplex communication. The designation for time slots in a frame may change depending on system needs. In this particular TDM frame 301, the first time slot 303 is designated as a control slot in which resource management information is communicated. In a typical implementation, there is frequent communication activity on the control slot 303. Communication on the control slot includes resource allocation and management information, identification information, and the like. Other slots 305, 307 are designated as transmit and receive slots. In some implementations, transmit and receive slots are implemented in separate frames. Several communication units may share a frame, each with its designated slot for transmit or receive operations. With this arrangement, a subscriber unit may be engaged in communications with another subscriber unit or other communicant during its transmit and receive slots, but generally has time between receive and transmit operations (dead time), and during periods of communication inactivity for monitoring and other purposes. According to the present invention, the subscriber unit uses available time to monitor for potential server sites, and to perform unassisted update of its monitor list as needed.

Figure 4:
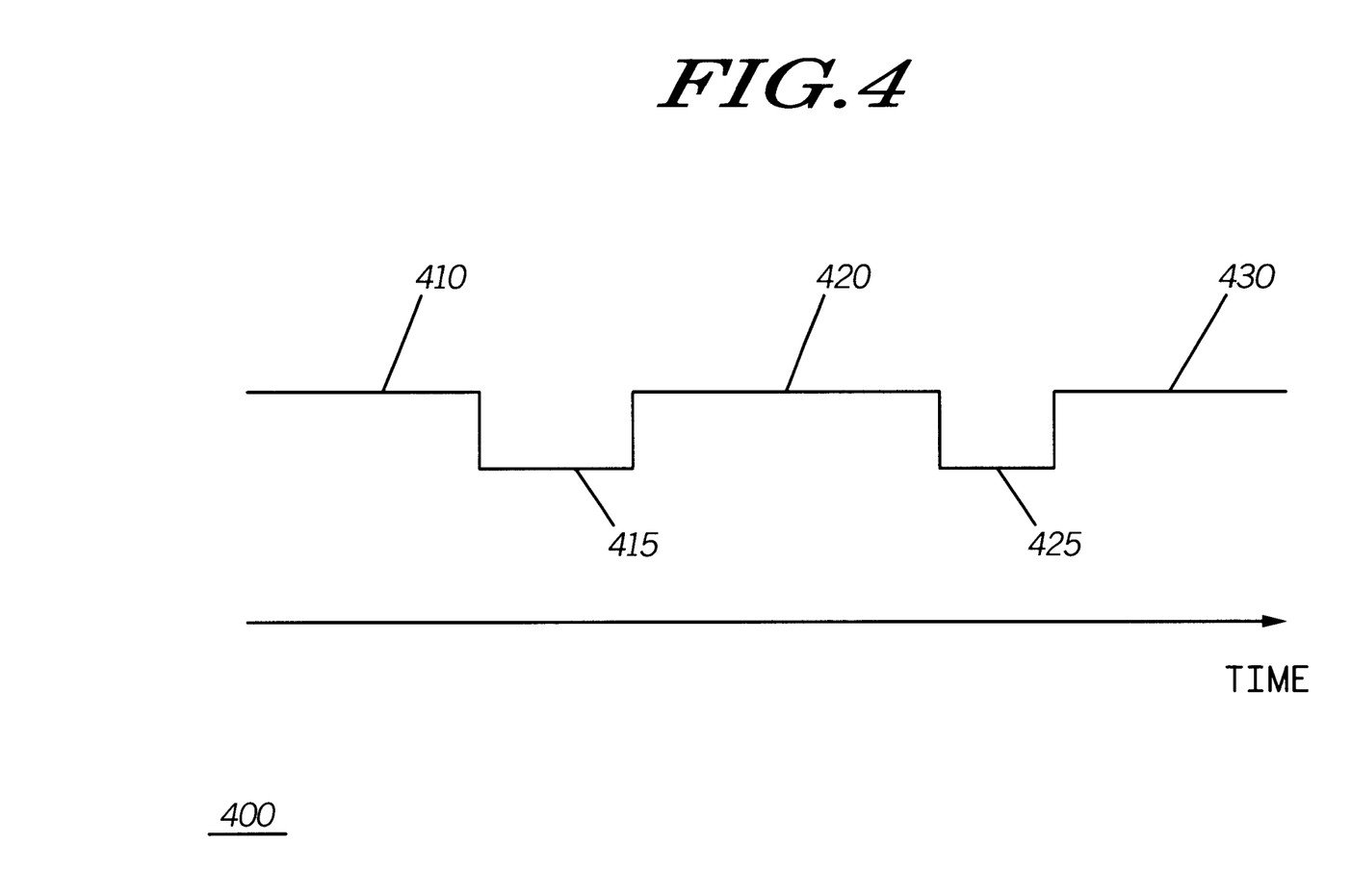
FIG. 4 is a timing diagram showing communication activity on a traffic channel, in accordance with the present invention.

In the preferred embodiment, communication between a server site and a subscriber unit during a dispatch call occurs on a control channel or on a traffic channel. The control channel is used for communication overhead functions, and is implemented using a technique such as the control slot described above. The traffic channel is used for voice or other data communication and is implemented using a time slot designated for receive and transmit operations. The traffic channel may also be converted for use as a temporary control channel (TCCH) when there is no voice or other data activity present on the traffic channel. FIG. 4 is a timing diagram showing an example of potential communication activity on a channel 400 and resultant channel designations, in accordance with the present invention. At time 410, the channel 400 operates as a traffic channel and conveys voice activity. At time 415, a lull occurs in the communication activity, and the channel transitions into a TCCH. Communication activity resumes at time 420 and another lull occurs at time 425 before activity is resumed at time 430. At time 425, the channel transitions into a TCCH. If the channel operates as a TCCH for an extended period of time, it is ordinarily then available for reassignment.

Figure 5:
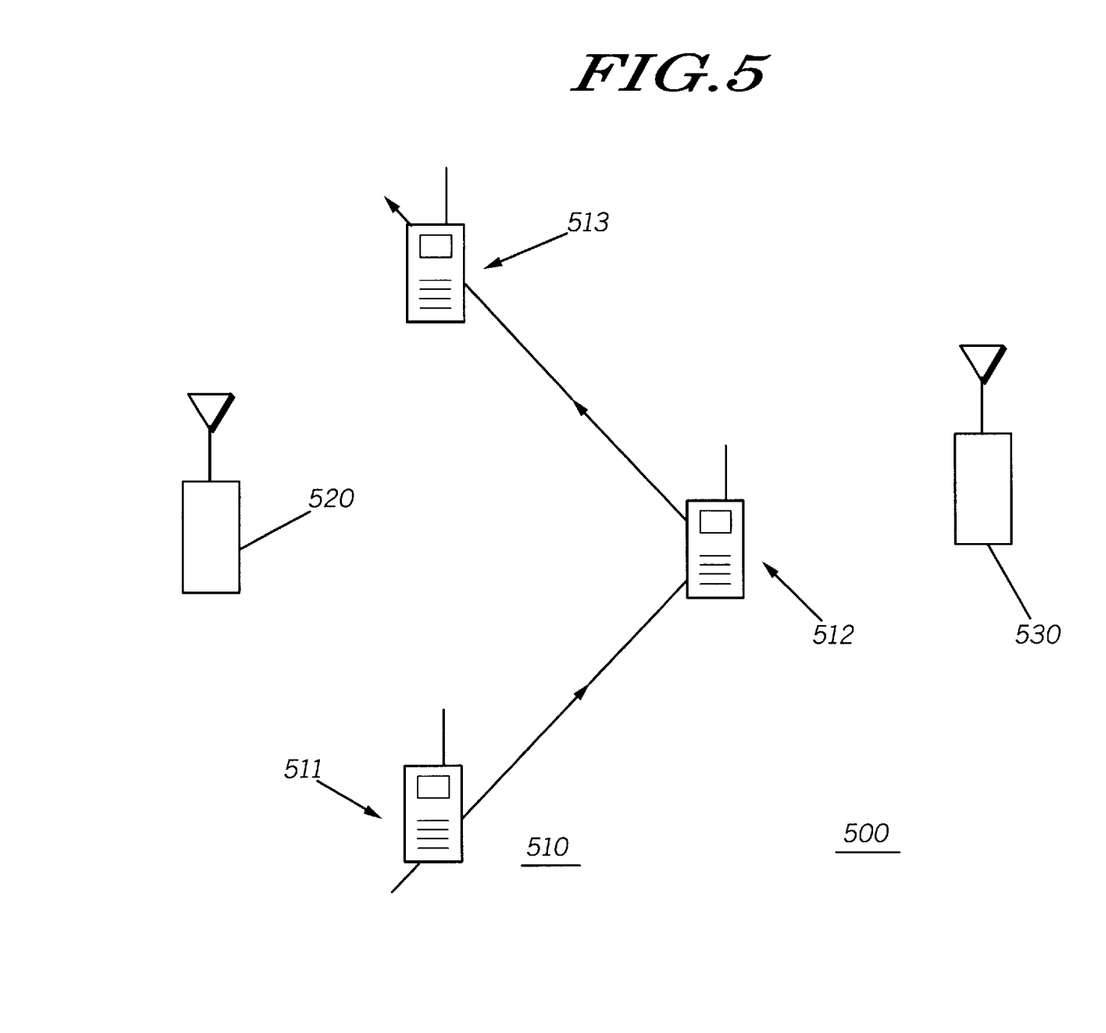
FIG. 5 illustrates potential server site choices for a subscriber unit traveling along a path between two sites, in accordance with the present invention.
Figure 6:
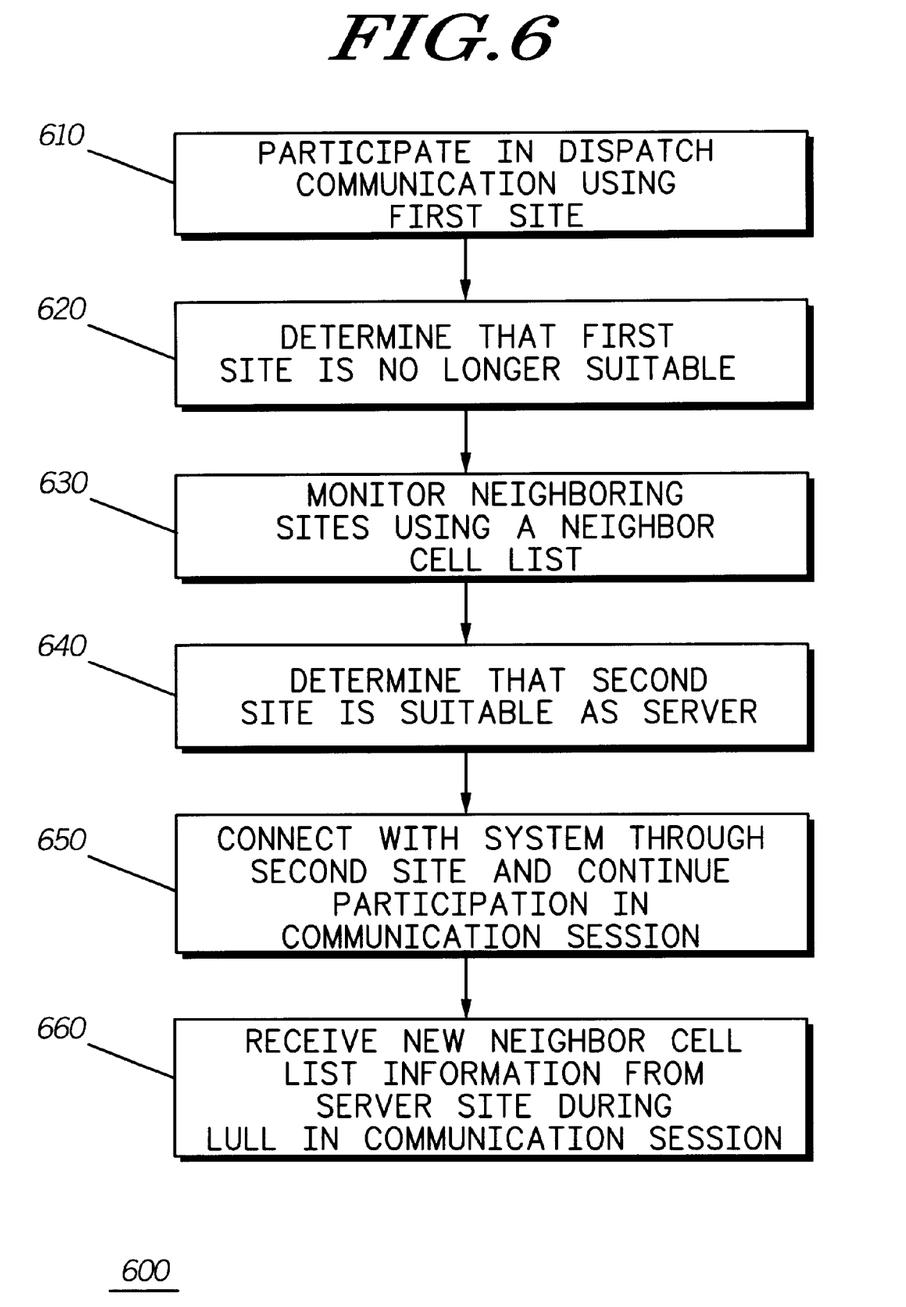
FIG. 6 is a summary of procedures used by a subscriber unit to obtain new neighbor list information while participating in an ongoing communication session, in accordance with the present invention.

FIG. 5 shows a communication environment 500 having a subscriber unit 510 operating along a path that traverses between two server sites 520, 530, in accordance with the present invention. FIG. 6 is a summary of procedures 600 used by the subscriber unit 510 to manage neighbor cell list information during an ongoing communication session, in accordance with the present invention. Referring to FIG. 5 and FIG. 6, at position 511, the subscriber unit 510 participates in an ongoing communication session using a first server site 520, step 610. In the preferred embodiment, the ongoing communication session corresponds to a group dispatch call. The group dispatch call involves a communicating group comprising several subscriber units operating through multiple server sites. At position 512, the subscriber unit determines that the first server site is no longer desirable or preferred for supporting the ongoing communication session, step 620. For example, the signal strength for signals communicated from the first server site, as indicated by a RSSI value, may have fallen below a particular threshold. Preferably, the subscriber unit monitors neighboring sites, based on its current and available neighbor cell list, to determine suitable server sites, step 630. The subscriber unit determines that a second site 530 is suitable as a server site, step 640, and selects that site as its server site.

The subscriber unit connects with the system through the second site 530, and continues participation in the ongoing communication session, step 650. In the preferred embodiment, the subscriber unit initiates communication with the second site 530 on a control channel, and obtains therefrom a communication or traffic channel assignment. Preferably, the subscriber unit cooperates with the second site 530 to establish a communication link in an expeditious manner, such that the ongoing communication session is maintained with minimum loss of participation.

Figure 7:
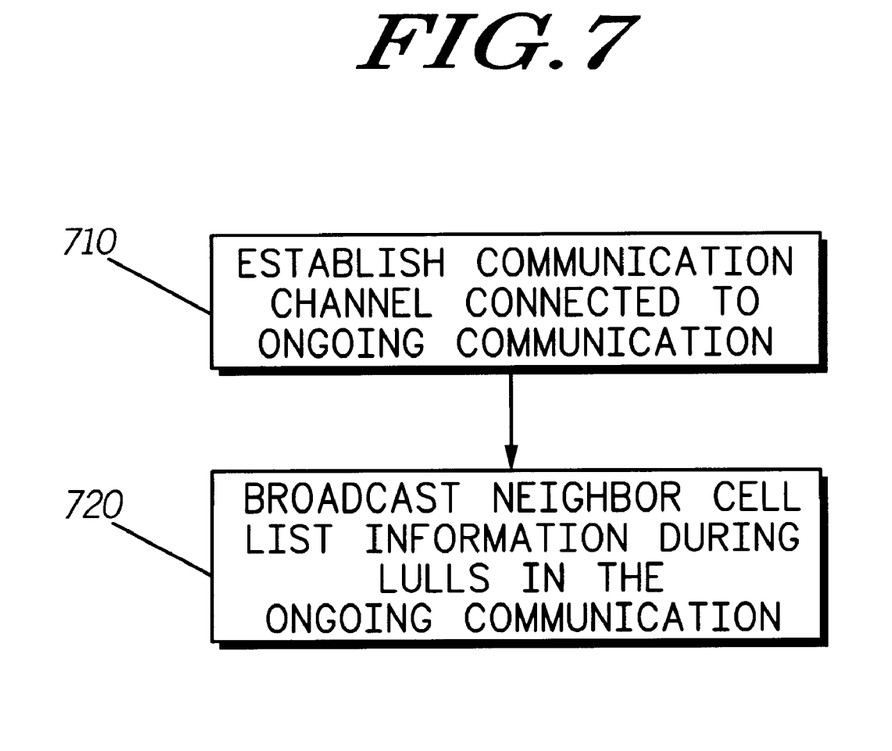
FIG. 7 is a summary of procedures used by a server site to transmit new neighbor cell information to a subscriber unit, in accordance with the present invention.

According to the present invention, upon switching to a new server site, the subscriber unit receives updated neighbor cell list information from the new server site 530 during a lull in communication activity during the communication session, step 660. FIG. 7 is a summary of procedures used to provide the subscriber unit with new neighbor cell list information, according to a first embodiment. The new server site 530 responds to a connection by the subscriber unit by establishing a communication channel connected to the ongoing communication session, step 710. The server site 530 then operates to automatically broadcast unsolicited neighbor cell list information to the subscriber unit during lulls in the ongoing communication session, step 720. For example, when establishing a connection for a dispatch call, the server site 530 connects a traffic channel to the dispatch call, and transmits activity from the dispatch call on the traffic channel. The server site then broadcasts neighbor cell list information to the subscriber unit during a period of inactivity on the traffic channel while supporting the dispatch call. In the preferred embodiment, the traffic channel is operated as a temporary control channel when a period of inactivity exists on the traffic channel that exceeds a predefined duration threshold. Thus, when broadcasting the neighbor cell list information, this information is transmitted on the temporary control channel. Preferably, the broadcast is repeatedly transmitted during lulls in voice activity to ensure that the information is received by the affected communicants.

Figure 8:
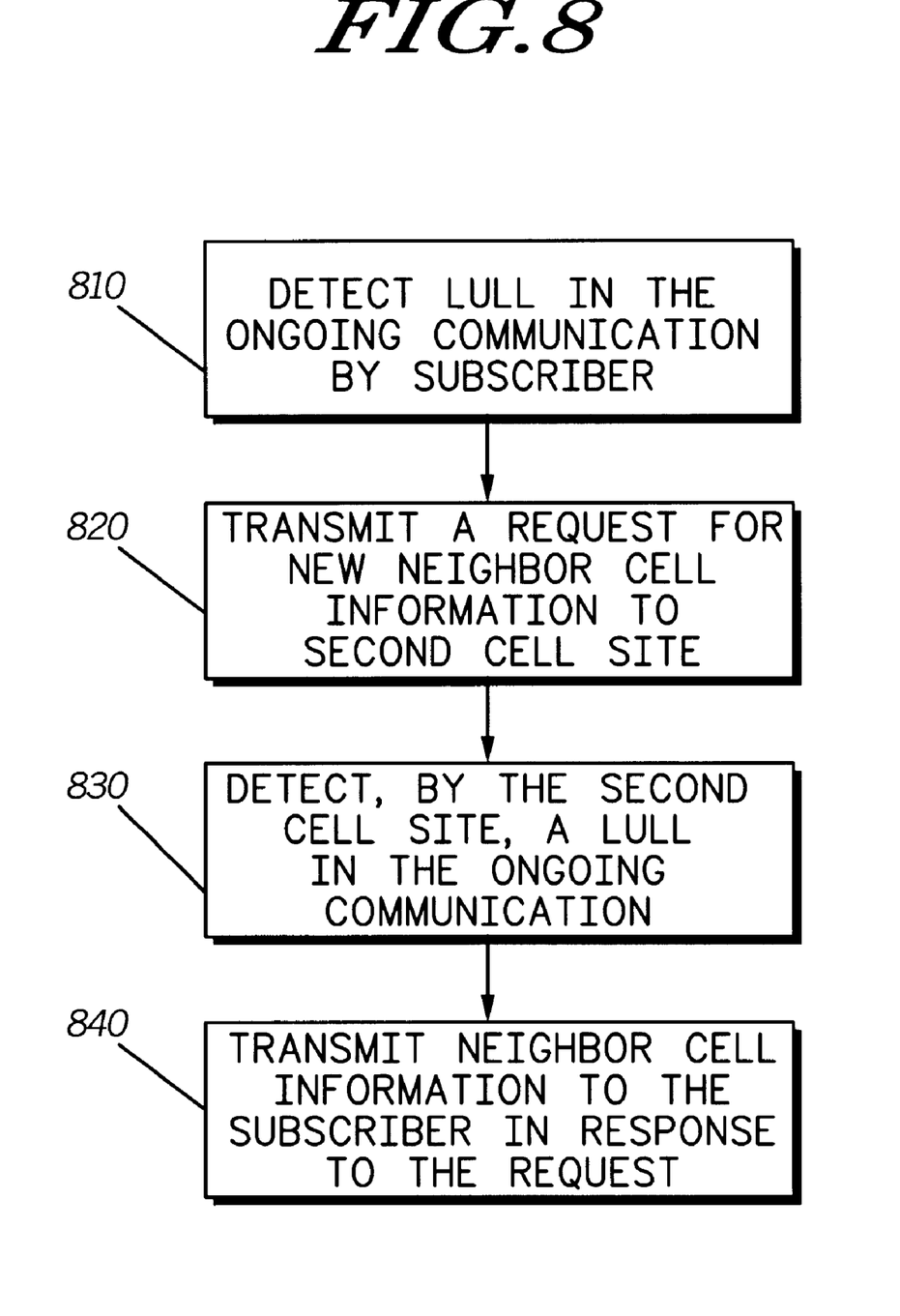
FIG. 8 is a second embodiment of procedures used by a server site to transmit new neighbor cell information to a subscriber unit, in accordance with the present invention.

FIG. 8 is a summary of procedures used in a second embodiment to provide the subscriber unit with updated neighbor cell list information. In this embodiment, the subscriber unit solicits new neighbor cell list information from the server site. After connecting to the new server site, the subscriber unit detects a lull in the ongoing communication, and during this period, transmits a request for new neighbor cell information to the server site, steps 810, 820. The server site receives this request, and in response monitors to detect a lull in the ongoing communication. Upon detecting a lull, the server site transmits new neighbor cell information to the subscriber unit during the lull, steps 830, 840. For dispatch calls of the preferred embodiment, the lull is detected when the traffic channel transitions to functions as a TCCH. Thus, the request and response for the neighbor cell list information occur on a TCCH.

Subsequent monitoring of neighbor sites for potential server sites is performed using the modified neighbor cell list. At position 513, the subscriber unit determines that the first site 520 is preferred when compared to the second site, and reverts to the first site as its server site.

The present invention offers significant advantages over the prior art. By obtaining new neighbor cell information during lulls in communication activity, the risk of missing communication information during a neighbor cell list update is reduced. A previous server site that is now neighboring the new server site will be reflected in the updated neighbor cell list. A subscriber unit may quickly revert to this previous server site, if appropriate, when a hand-off was performed because of a temporary radio frequency (RF) interference or obstruction, such as from a passing vehicle or from a building or bridge. This problem, commonly encountered in some prior art systems, is addressed by the present invention.

What is claimed is:

1. In a radio communication system having a subscriber unit participating in a dispatch communication supported by a first cell site, a method comprising the steps of:

at the subscriber unit:
   determining that the first cell site is no longer desirable for supporting the dispatch communication;
   monitoring neighboring cell sites according to a neighbor cell list to select a second cell site suitable for supporting the dispatch communication;
   connecting with the second cell site to maintain participation in the dispatch communication;
   detecting a lull that represents a period of communication inactivity on a traffic channel during the dispatch communication; and
   receiving neighbor cell list information from the second cell site during the detected lull in the dispatch communication after connection with the second cell site.

2. The method of claim 1, further comprising, the steps of:
at the subscriber unit:
   detecting a lull in the dispatch communication; and
   transmitting a request for neighbor cell list information to the second cell site during the lull in the dispatch communication.

3. The method of claim 1, further comprising, the steps of:
at the second cell site:
   detecting a lull in the dispatch communication; and
   transmitting neighbor cell list information to the subscriber unit during the lull in the dispatch communication.

4. The method of claim 3, wherein the step of transmitting comprises the step of transmitting the neighbor cell list information in response to a request received from the subscriber unit.

5. The method of claim 1, further comprising the step of, at the second cell site, automatically broadcasting neighbor cell list information upon detection of a lull in the dispatch communication subsequent to the step of connecting.

6. The method of claim 5, further comprising the step of, at the second cell site, periodically broadcasting neighbor cell list information during lulls in the dispatch communication that occur subsequent to the step of connecting.

7. In a radio communication system having a subscriber unit participating in an ongoing communication supported by a first cell site, a method comprising the steps of:

at the subscriber unit:
  determining that the first cell site is no longer desirable for supporting the ongoing communication;
  monitoring neighboring cell sites based on a neighbor cell list to select a second cell site suitable for supporting the ongoing communication;
  contacting the second cell site to request support for participation in the ongoing communication;

at the second cell site:
  establishing a communication channel that is connected to the ongoing communication;
  detecting a lull based on a period of voice inactivity during the ongoing communication; and
  broadcasting neighbor cell list information to the subscriber unit on the communication channel during the detected lull in the ongoing communication.

8. The method of claim 7, wherein the step of broadcasting comprises the step of periodically broadcasting neighbor cell list information during lulls in the ongoing communication.

9. The method of claim 7, further comprising the steps of, at the subscriber unit:

detecting a lull in the ongoing communication; and
requesting transmission of neighbor cell list information from the second cell site during the detected lull.

10. In a radio communication system having a transceiver, a method comprising the steps of:

at the transceiver:
  participating in a dispatch call through a first server site;
  monitoring neighboring server sites to select a second server site as a suitable substitute for the first server site;
  connecting to the second server site, via a control channel, to request support for ongoing participation in the dispatch call;

at the second server site:
  connecting a traffic channel to the dispatch call;
  transmitting activity from the dispatch call on the traffic channel;
  detecting a lull based on a period of voice or data inactivity on the traffic channel; and
  broadcasting neighbor cell list information to the transceiver during the detected lull while maintaining support of the dispatch call.

11. The method of claim 10, wherein the step of broadcasting comprises the step of repeatedly transmitting neighbor cell list information to the transceiver during lulls in voice activity on the dispatch call.

12. The method of claim 10, further comprising the step of:

operating the traffic channel as a temporary control channel when a period of inactivity exists on the traffic channel that exceeds a predefined duration threshold; and wherein the step of broadcasting comprises the step of transmitting neighbor cell list information on the temporary control channel.

13. In a radio communication system having a transceiver, a method comprising the steps of:

at the transceiver:
  participating in a dispatch call through a first server site;
  monitoring neighboring server sites to select a second server site as a suitable substitute for the first server site;
  connecting to the second server site, via a control channel, to request support for ongoing participation in the dispatch call;

at the second server site:
  connecting a traffic channel to the dispatch call;
  transmitting activity from the dispatch call on the traffic channel;
  operating the traffic channel as a temporary control channel when a period of inactivity exists on the traffic channel that exceeds a predefined duration threshold;
  broadcasting neighbor cell list information to the transceiver during a period of inactivity on the traffic channel while supporting the dispatch call, including the step of transmitting neighbor cell list information on the temporary control channel;

at the transceiver:
  detecting operation of the traffic channel as a temporary control channel; and
  transmitting a request for neighbor cell list information to the second server site on the temporary control channel.

14. The method of claim 13, wherein the step of broadcasting comprises the step of transmitting neighbor cell list information in response to the request transmitted by the transceiver.

* * * * *